United States Patent [19]

Slaughter

[11] 4,108,535

[45] Aug. 22, 1978

[54] SAFETY DEVICE FOR BICYCLE

[76] Inventor: Harold W. Slaughter, R.R. #2, Fargo, N. Dak. 58102

[21] Appl. No.: 747,423

[22] Filed: Dec. 3, 1976

[51] Int. Cl.$^2$ .............................................. G02B 5/12
[52] U.S. Cl. ................................. 350/99; 280/289 R; 301/37 SA; 350/97
[58] Field of Search ...................... 350/99, 105; 46/53, 46/58; 280/200, 180; 301/37 SA, 37 SR; D34/5 L, 15 F, 15 W

[56] References Cited

U.S. PATENT DOCUMENTS

| 453,411 | 6/1891 | Letzing | 46/55 |
|---|---|---|---|
| 2,688,820 | 9/1954 | Shemet | 46/53 |
| 2,797,621 | 7/1957 | Gladen | 46/58 |
| 3,786,583 | 1/1974 | Revor | 46/58 |
| 3,954,236 | 5/1976 | Brown | 46/53 |
| 3,974,369 | 8/1976 | Chmela et al. | 46/58 |
| 4,046,098 | 9/1977 | Mancinelli et al. | 350/99 |

OTHER PUBLICATIONS

Wheel Covers bulletin by U.S. Product Development Company, 10 W. Pine St., Zionsville, Ind.

*Primary Examiner*—John K. Corbin
*Assistant Examiner*—B. W. delos Reyes
*Attorney, Agent, or Firm*—Merchant, Gould, Smith, Edell, Welter & Schmidt

[57] ABSTRACT

A safety device suitable for mounting on bicycles which includes a pinwheel rotatable in response to airflow relative to the bicycle. The pinwheel carries a pattern of material visually perceptible at a distance which changes in appearance upon rotation of the pinwheel. A shroud surrounds the pinwheel to prevent accidental contact with the rotating pinwheel and to direct airflow against the pinwheel. The shroud may be convergent in order to increase the effect of the airflow on the pinwheel.

8 Claims, 6 Drawing Figures

SAFETY DEVICE FOR BICYCLE

BACKGROUND OF THE INVENTION

The present invention relates to the field of safety devices suitable for mounting on bicycles and the like, which devices present a changing appearance in response to airflow relative to the device.

It has been known to utilize reflective devices in conjunction with bicycles and the like as a safety precaution. Typically, such safety devices have consisted of one or more reflective surfaces mounted on the bicycle. When light, such as that from the headlights of an automobile, strikes the reflective surface, it is reflected back toward the source of light to warn of the presence of the bicycle.

It has also been known to utilize rotating safety devices attached to various parts of the bicycle. One such device has a generally star-shaped configuration of intersecting light-reflecting surfaces and is suspended for wind-driven rotation between the spokes of the bicycle wheel. Another device utilizes semispherical members having reflective faces and extending radially from a central hub which rotates on a spindle in response to airflow past the semispherical members. Such devices are open to the surroundings and depend on the airflow in their immediate vicinity to operate their rotatable members.

SUMMARY OF THE INVENTION

In a safety device according to the present invention, a protective annular shroud having an air inlet and an air outlet surrounds a rotatable member supported within the shroud for rotation in response to airflow through the shroud, and is mounted on the bicycle or other object to be protected. The rotatable member carries signal means for providing a visible pattern which changes in appearance with rotation of the rotatable member within the protective annular shroud. The pattern thus produced warns the operators of motor vehicles, and others, of the presence of a bicycle or the like upon which the safety device is mounted. The pattern may be such as to also produce a decorative, intriguing design which has ornamental and novelty value.

The annular shroud prevents inadvertent contact with the rotatable member, thus preventing injury to persons who might otherwise come in contact with the rotating member as well as preventing damage to the rotating member or interference with its rotation within the shroud. The annular shroud may be convergent from its air inlet to its air outlet, to increase the velocity of the airflow through the annular shroud at its air outlet end. A rotatable member positioned within the air outlet thus experiences an airflow having a velocity greater than the velocity of the airflow past the bicycle or the like upon which the safety device is mounted.

The annular shroud may contain a plurality of slots formed in its periphery to permit the passage of air through the shroud in a plane transverse to the axis of the shroud. This permits the shroud to be positioned transversely to the direction of airflow resulting from the movement of the bicycle or the like, so that the rotation of the rotatable member within the shroud may be viewed from the side of the bicycle.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain prefered embodiments of the invention.

DESCRIPTION OF THE PREFERRED EMBODIMENT

Figure 1:
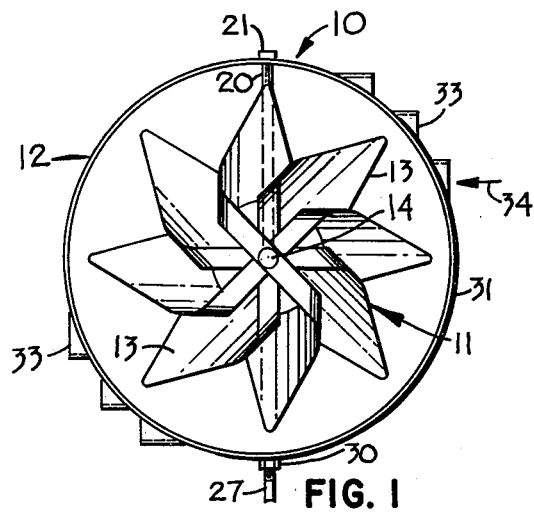
FIG. 1 is a view in front elevation of safety device according to the invention.
Figure 2:
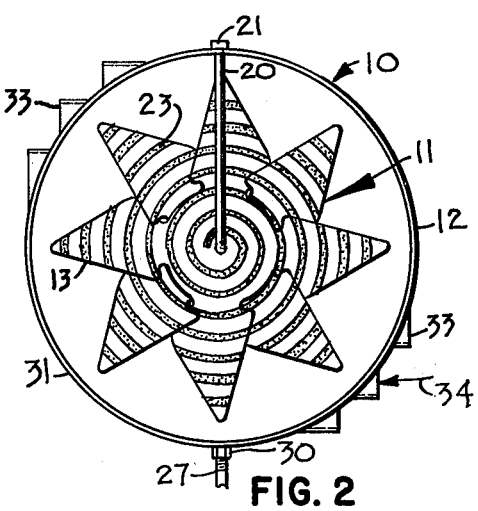
FIG. 2 is a view in rear elevation of the safety device shown in FIG. 1.

Referring to the drawing, wherein like numerals represent like elements throughout the several views, there is illustrated a safety device, generally designated at 10, suitable for mounting on a bicycle or the like. The safety device 10 includes a rotor 11 and a protective shroud 12 for mounting the rotor in a desired location. Rotor 11 is shown to comprise a pinwheel of eight directional vanes 13 spinning on the axis of a pin 14 and defining a body having an irregular edge, a front face best seen in FIG. 1, and a rear face best seen in FIG. 2, both faces being generally transverse with respect to the axis of pin 14 which is generally horizontal as shown in FIGS. 1 and 2. Other forms of rotor may also be used.

Figures 3, 6:
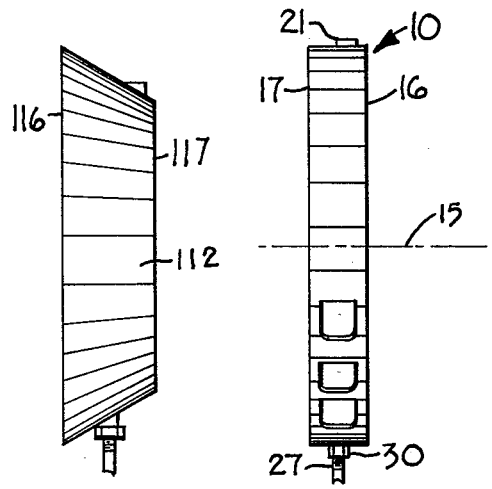
FIG. 3 is a view in side elevation of the safety device shown in FIG. 1, viewed from the left of that figure.
FIG. 6 is a view like FIG. 3 showing a safety device having a shroud which converses from the air inlet to the air outlet.

Shroud 12 surrounds rotor 11 in generally edgewise relation and extends along a generally horizontal axis of symmetry 15 between an air inlet 16 and an air outlet 17 as shown in FIG. 3. A strut 20 is secured at one end to shroud 12 and projects into the shroud: pin 14 is secured to the other end 21 of strut 20, so that the spin axis of rotor 11 is substantially aligned with the axis of symmetry of the shroud.

Referring more particularly to FIG. 2, the rear face of rotor 11 carries visual signal means 23 in the form of a pattern of light reflective material deposited to have the configuration of a spiral, which is visually complete at the center but is interrupted as it crosses outer portions of the vanes. While other patterns may be used, the spiral has the advantage that it can be recognized as being in motion, inwardly or outwardly depending on the handedness of the spiral, when the rotor is spinning so fast that other geometric patterns become formless blurs. Another useful pattern comprises alternate different reflective colors at the outer ends of the vanes: this results in a twinkling effect upon rotation of the rotor.

Figure 4:
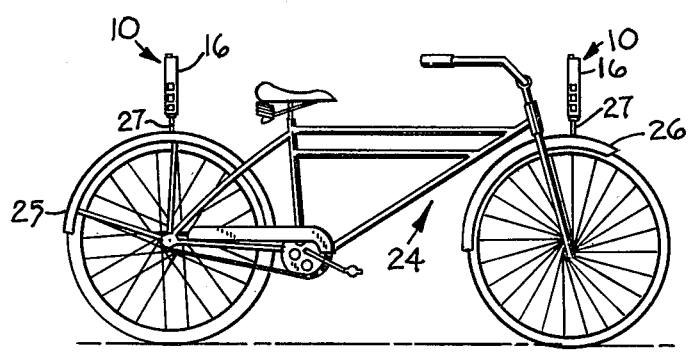
FIG. 4 is a view in side elevation of a pair of safety devices mounted on a bicycle.

FIG. 4 shows a bicycle 24 with a pair of safety devices 10 secured to fixed portions thereof such as rear fender 25 and front fender 26. A stem 27 is secured to project upwardly from the fender and is received in a fitting 30 at the bottom of shroud 12. Devices 10 are mounted on fenders 25 and 26 with their faces 16 directed forwardly.

Figure 5:
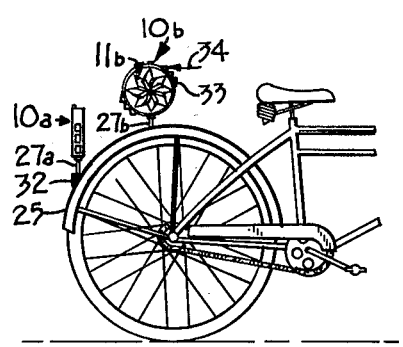
FIG. 5 is a view in side elevation of a pair of safety devices mounted on bicycle in another orientation.

Referring again to FIGS. 1 and 2, the wall 31 of shroud 12 is provided with a plurality of louvred openings 33 to admit air laterally to engage rotor 11. For effective signaling effect the shroud must be seen in its aspect illustrated in FIG. 2. While this is wholly satisfactory for giving a warning signal to the rear of a bicycle, as suggested in FIG. 4, it gives no warning laterally. As shown in FIG. 5, twin devices can be mounted on fender 25. Stem 27a of device 10a is carried on a suitable bracket 32 with the device oriented as before, and stem 27b of device 10b is mounted at the top of the fender, with the device facing crosswise for visibility, as seen in FIG. 5. The relative wind enters louvres 33 as indicated by arrow 34 to spin rotor 11b, and the spiral pattern is observable from the opposite side of the bicycle.

I have illustrated a device having a single rotor, but it will be understood that plural rotors may be installed in shroud 12, for rotation in the same direction or in opposite directions.

The embodied invention shown in FIG. 6 differs from that shown in FIG. 3 in the construction of shroud 112, which converges from air inlet 116 to air outlet 117. By this means the speed at which rotor 11 spins may be augmented, since the air emerging from outlet 117 is moving more rapidly than that entering at inlet 116. This structure is not preferable in the orientation of device 10b in FIG. 5.

OPERATION

The operation of the arrangement is not difficult to understand. As signal device 10 is mounted on a bicycle, at a desired location, with its air inlet 16 or one set of louvres 33 directed forwardly, and secured in position. Now movement of the bicycle is accompanied by rotation of the rotor of the device, causing the appearance of the pattern to change and thus drawing attention to the presence of the bicycle. Even if the bicycle is stationary, any breeze can cause movement of the rotor and give a warning signal.

Although free movement of the rotor is possible, the shroud performs a dual function—it partially protects the rider from contact with the spinning rotor, and it partially protects the rotor from damage, by impact with a blowing garment of the rider, for example.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A safety device suitable for mounting on bicycles, said safety device comprising:
   a shroud of generally circular cross section having a generally horizontal longitudinal axis extending between open ends including an open air inlet and an open air outlet for enabling passage of air through the interior of said shroud;
   a strut having first and second ends, said first end being attached to said shroud with said strut extending radially inwardly of said shroud, and said second end being positioned generally coincident with said longitudinal axis of said shroud;
   a pinwheel rotatably attached to said second end of said strut within said shroud for rotation about a generally horizontal spin axis in response to air flow through said shroud; and
   light reflective material carried by said pinwheel to provide a visible pattern which changes upon rotation of said pinwheel in the presence of light.

2. A safety device according to claim 1 wherein the diameter of said shroud is substantially constant from inlet to outlet.

3. A safety device according to claim 1 where the diameter of said shroud is not constant from inlet to outlet.

4. Safety apparatus comprising, in combination:
   a rotor having an edge and a pair of opposite faces, said rotor including a plurality of directional wind-engaging vanes and being arranged to be driven about a spin axis by wind impinging on said edge or at least one of said faces;
   a protective shroud substantially surrounding said rotor edgewise and having a generally regular configuration about an axis of symmetry passing through an air inlet and an air outlet;
   means mounting said rotor for rotation in said shroud with said spin axis substantially aligned with said axis of symmetry;
   means fixedly mounting said shroud for impingement of said rotor by wind relative thereto; and
   signal means on said vanes having a visually perceptible pattern which changes in appearance with rotation of said vanes.

5. Safety apparatus comprising, in combination:
   a bicycle having wheels and a frame including fenders;
   a protective shroud carried by said bicycle and having an open air inlet and an open air outlet spaced therefrom along a longitudinal axis;
   a vaned rotor mounted in said shroud for rotation about a spin axis by air passing through said shroud; and
   signal means carried on the vanes of said rotor in a noncircular pattern to be visually perceived as moving upon rotation of said rotor.

6. A safety device suitable for mounting on bicycles, comprising, in combination:
   a rotatable member having a generally horizontal axis of rotation and configured to rotate about said axis in response to air flow aligned with and air flow transverse to said axis;
   a protective shroud comprising a housing encompassing said member and having a generally horizontal longitudinal axis extending between a pair of opposite open ends;
   means for mounting said member in said shroud with said axis of rotation aligned with said longitudinal axis;
   means for mounting said shroud fixedly with said axes in desired alignment with the direction of a flow of air;
   and visual signal reflector means carried by said rotatable member for providing within said shroud a pattern visible in the direction of said axis of rotation which changes in appearance as said rotatable member rotates.

7. A safety device suitable for mounting on bicycles, comprising, in combination:
   a rotatable member having an axis of rotation and configured to rotate about said axis in response to air flow aligned with and air flow transverse to said axis;

a protective shroud comprising a housing encompassing said member and having a longitudinal axis extending between a pair of opposite open ends;

a plurality of louvers formed in the periphery of said shroud to permit the passage of air through said shroud in a direction transverse to the axis of said shroud;

means for mounting said member in said shroud with said axis of rotation aligned with said longitudinal axis;

and visual signal means carried by said rotatable member for providing within said shroud a pattern visible in the direction of said axis of rotation which changes in appearance as said rotatable member rotates.

8. A safety device suitable for mounting on bicycles, comprising, in combination:

a rotatable member having an axis of rotation and configured to rotate about said axis in response to air flow aligned with and air flow transverse to said axis;

a protective shroud comprising a housing encompassing said member and having a longitudinal axis extending between a pair of opposite open ends;

said shroud converging from said air inlet to said air outlet so that the velocity of air flow through said outlet is greater than the velocity of air flow through said inlet;

means for mounting said member in said shroud with said axis of rotation aligned with said longitudinal axis;

means for mounting said shroud fixedly with said axes in desired alignment with the direction of a flow of air;

and visual signal means carried by said rotatable member for providing within said shroud a pattern visible in the direction of said axis of rotation which changes in appearance as said rotatable member rotates.

* * * * *